(12) United States Patent
McSwain

(10) Patent No.: US 6,541,057 B1
(45) Date of Patent: Apr. 1, 2003

(54) APPARATUS FOR SHELLING NUTS

(76) Inventor: Thad M. McSwain, 2103 S. Cherry St., Stuttgart, AR (US) 72160

( * ) Notice: Subject to any disclaimer, the term of this patent is extended or adjusted under 35 U.S.C. 154(b) by 0 days.

(21) Appl. No.: 09/627,673

(22) Filed: Jul. 28, 2000

Related U.S. Application Data

(60) Provisional application No. 60/148,087, filed on Aug. 10, 1999.

(51) Int. Cl.$^7$ .................................................. A23N 5/00
(52) U.S. Cl. ........................... 426/482; 99/568; 99/575; 99/579; 99/580
(58) Field of Search .................. 99/514, 539, 567–569, 99/574–575, 579–582; 426/479–482

(56) References Cited

U.S. PATENT DOCUMENTS

| | | | | |
|---|---|---|---|---|
| 947,932 A | * | 2/1910 | Peckham | |
| 1,342,692 A | * | 6/1920 | Pape | |
| 1,704,427 A | * | 3/1929 | Coggins | |
| 2,143,020 A | * | 1/1939 | Markley et al. | 146/32 |
| 2,144,841 A | * | 1/1939 | Glaser | 146/11 |
| 2,279,987 A | * | 4/1942 | Guerra | 146/8 |
| 2,408,510 A | * | 10/1946 | Feldmann | 146/12 |
| 4,073,032 A | * | 2/1978 | Packwood | 99/574 |
| 4,462,309 A | * | 7/1984 | Frazier | 99/575 |
| 5,415,085 A | * | 5/1995 | Thomson | 99/574 |
| 5,697,292 A | * | 12/1997 | Simmons | 99/574 |

* cited by examiner

*Primary Examiner*—Keith Hendricks
*Assistant Examiner*—Drew Becker

(57) ABSTRACT

An apparatus for shelling nuts comprises adjustably opposed, manual or motor-driven, rotary wheel-type rollers that engage nuts and, as they rotate, forcibly crack the shell as the nut is transported between the rollers. The clearance between the opposed rollers is adjustable by the user to obtain an optimum cracking result. A receiving hopper is provided wherein a ready supply of nuts can be presented to the opposed rollers. The hopper design includes a chute projection that orients and directs the nuts toward the rollers where an adjustable gauge further positions the nut for optimal entry. The opposed, counter-rotating cracking rollers are grooved in a manner that provides multiple surfaces with which to contact the nut and thereby apply a plurality of forces to its perimeter. This plurality of forces is uniformly applied to produce multiple fractures in the shell. These cracking forces are applied gradually as the clearance between the rollers diminishes, thereby avoiding sharp impacts and the resulting expulsion of shell fragments. The multiple fractures provided by the grooved rollers provide a more complete cracking of the nut thereby reducing damage to the nut meat inside. After passing through the cracking rollers, the nuts and shell fragments are deposited onto a discharge chute and exit the device to a container supplied by the user.

12 Claims, 4 Drawing Sheets

APPARATUS FOR SHELLING NUTS

CROSS REFERENCE TO RELATED APPLICATIONS

This application claims priority from U.S. Provisional Application Ser. No. 60/148,087, filed Aug. 10, 1999, entitled "NUT CRACKER" that is hereby incorporated by reference in its entirety for all purposes.

BACKGROUND OF THE INVENTION

1. Field of the Invention

The invention relates generally to cracking and shelling nuts and more particularly, to an apparatus and method for shelling nuts such as pecans, without damaging the nut meat.

2. Description of Related Art

Nut shelling apparatuses that crack and shell various types and sizes of nuts are well known in the art. These nut shelling apparatus range from simple table models, which can be operated manually or by an electrical or battery power driven motor, to sophisticated commercial models used in high volume production. In each instance, the problem arises as to the amount of pressure necessary to crack the shell, while leaving the meat of the nut undamaged or in whole pieces.

The problem is further complicated by the fact that nuts come in varying sizes. The cracking chamber that cracks the nut must accommodate a variety of shapes and sizes of nuts. The accommodation to the adjustment must be able to avoid over cracking or under cracking the nut. Most nut shelling apparatuses use a cracking device, such as a lever, ratchet teeth, or some type of striking device to crack the nut. The use of sharp impacts such as these can result in pieces or fragments of the shell remaining in the cracking chamber, thereby producing a potential reliability problem of the nut cracker, or broken nut meat as a result of uneven cracking pressure.

From the foregoing, it can be seen that there is a need for a nut shelling apparatus that is easy to use, provides reliability in cracking nuts of various sizes and provides minimal damage to the nut meat.

SUMMARY OF THE INVENTION

To overcome the limitations of the prior art described above, and to overcome other limitations that will become apparent upon reading and understanding the present specification, the present invention discloses a simple, safe, and efficient nut shelling apparatus that is especially adapted to cracking the shells of nuts such as pecans without damaging the nut meat.

The nut shelling apparatus disclosed herein introduces the nut between opposed grooved rollers, which, when operated in a counter-rotating fashion, will grip the nut and apply increasing force to crack the shell. The grooves in the rollers direct the cracking forces diagonally across the nut, thereby providing multiple fractures and a more complete breakage of the shell. The clearance between the rollers is adjustable by the user to obtain an optimal result. Adjustment is not critical and nuts of similar size will be cracked with minimal damage to the nut meat inside.

The device is contemplated as having manual and/or motor-driven means of operations, with the motor drive components being considered a value-added option for higher volume use. The manual crank is further contemplated as being removable for storage and for safety during motorized operation.

A supply hopper is specially-configured to guide and direct the nuts to the opening between the grooved rollers. A gauging plate coupled to an adjustment mechanism varies the clearance in the throat of the hopper to inhibit oversize nuts from entering the cracking rollers. A projecting portion of the gauging plate extends through a slot in the enclosure to provide a visual indication of the position of the gauge. A graduated scale is provided beside the slot to indicate the relative spacing between the rollers.

In operation, the user places a plurality of nuts into the supply hopper, the nuts are directed to the grooved cracking rollers, the operator turns a crank or engages a motor drive to turn the counter-rotating rollers, the nuts are guided between the opposed rollers, increasing force is applied to crack the shells, the cracked nuts are carried through the rollers and discharged onto an inclined chute, and the nut meats and shell fragments are collected in a dish, pan, or other container supplied by the user.

An object of this invention is to provide a simple, reliable means of cracking and shelling nuts of varying size—avoiding the drawbacks of conventional nut shelling apparatuses. This invention is particularly well-suited to table nuts and can be operated in the home when a large quantity of nuts must be cracked with minimal damage to the nut meat.

These and various other objects, features, and advantages of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of an apparatus and method for shelling nuts in accordance with the principles of the present invention.

BRIEF DESCRIPTION OF THE DRAWINGS

Referring now to the drawings in which like reference numerals and letters indicate corresponding elements throughout the several views.

DESCRIPTION OF THE PREFERRED EMBODIMENTS

Reference is now made to the accompanying drawings, which form a part hereof, and in which is shown by way of illustration specific embodiments in which the invention may be practiced. It is to be understood that other embodiments may be utilized and structural changes may be made without departing from the scope of the present invention.

Figure 1:
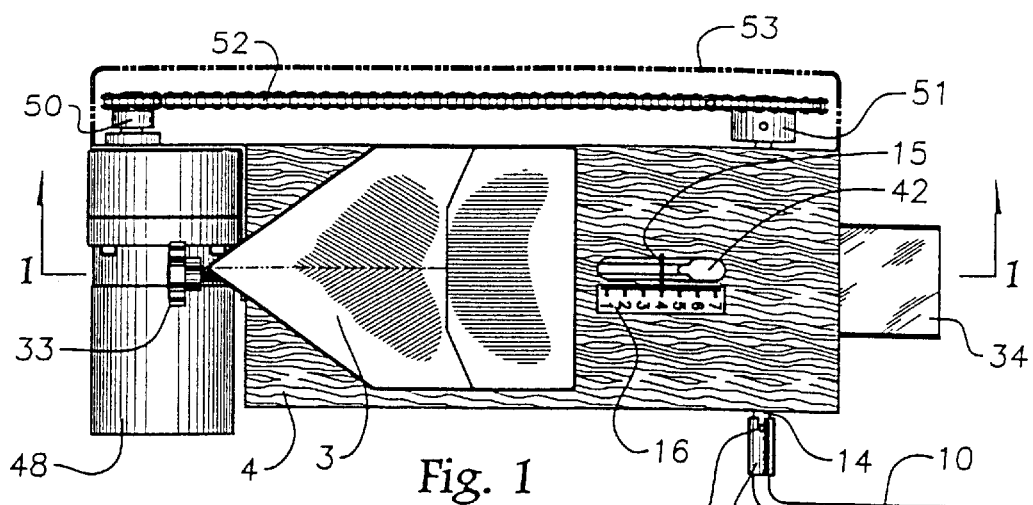
FIG. 1 is a top view of a fully enclosed apparatus for shelling nuts in accordance with the principles of the present invention.

Reference is now made to FIG. 1 that depicts an illustrative but not limiting diagram of a top view of the apparatus for shelling nuts in a closed state with all driven parts safely contained within the enclosure. A detachable and removable crank comprising an offset bar 10, a roller handle 11, and a slotted coupling 12 provide for manual operation. The coupling 12 engages a pin 13 on the input drive shaft 14 to transfer rotational movement to the internal mechanism. User adjustment of the knob 33 further described in FIGS. 2 and 3, displaces the gauging plate 15 and other internal components. The movement of the gauging plate 15 can be observed through a slot 42 in the top panel 4 and a graduated scale 16 may be used to gauge the relative clearance between the cracking rollers. The supply hopper 3 and discharge chute 34 are shown in plan view for proximal reference, as is the optional drive motor 48 and its related components.

Figure 2:
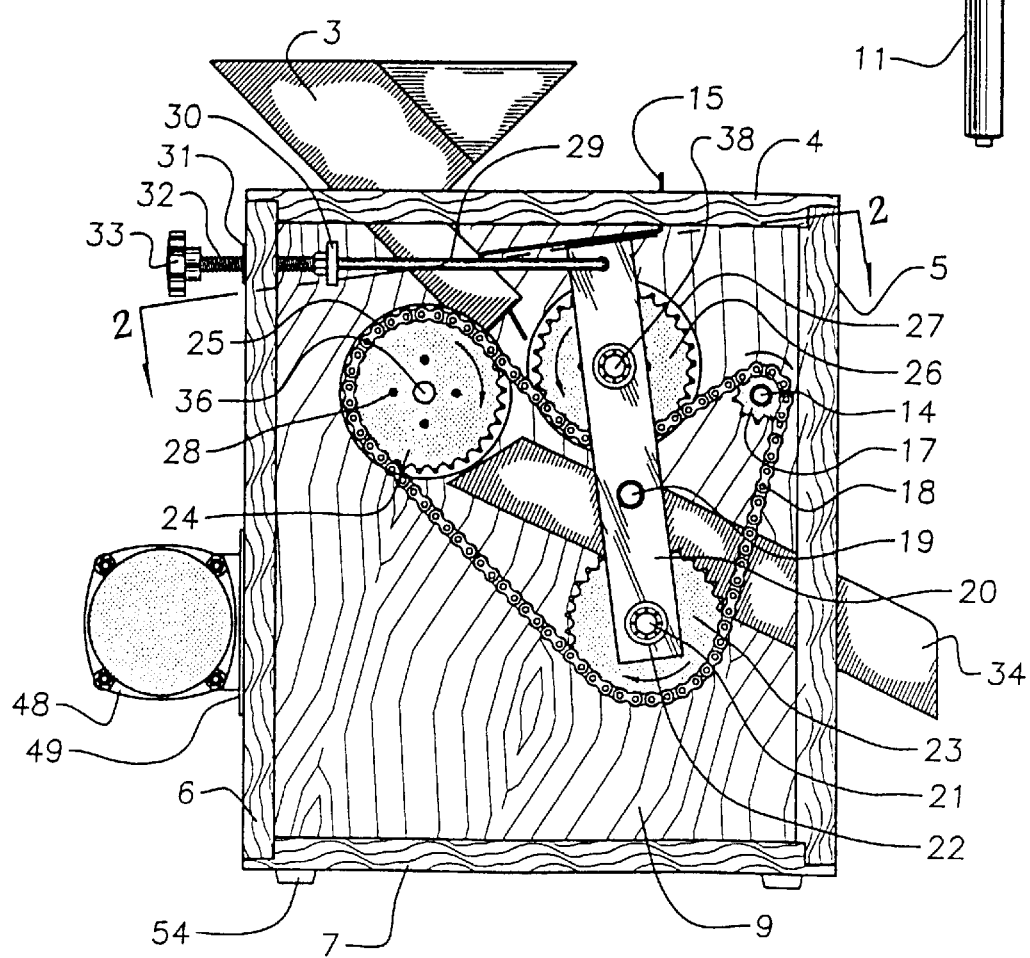
FIG. 2 depicts the invention upright with the right side cover removed to expose internal mechanisms.

FIG. 2 depicts an upright view of the apparatus for shelling nuts with the right panel 8 removed. The enclosure preferably made of wood, but may alternatively be made of suitable metal or plastic, comprises a top panel 4, front panel 5, rear panel 6, base 7, left panel 9, and a removable right panel 8 (not shown in FIG. 2).

Inside the enclosure are chain driven elements that effect the process of cracking nuts. A driving sprocket 17 is secured to the input drive shaft 14 and propels the chain 18 in a clockwise direction. The chain 18 engages the idler sprocket 23, the fixed sprocket 24, the moveable sprocket 26 and returns to the driving sprocket 17. The fixed grooved roller 25 is coaxial with the fixed sprocket 24 and multiple drive pins 28 mutually engage both so that rotational force is transferred to the roller. Likewise, the moveable sprocket 26 is coupled to the driving sprocket 17. The fixed grooved roller 25 is coaxial with the fixed sprocket 24 and multiple drive pins 28 mutually engage both so that rotational force is transferred to the roller. Likewise, the moveable sprocket 26 is coupled to the counter-rotating roller 27 by multiple drive pins 28. As can be seen in the other FIGS., both roller assemblies and the idler sprocket are suitable bushed with bearings so as to revolve on fixed shafts.

A pivot bracket 20 encloses the idler sprocket 23, the movable sprocket 26 and counter-rotating roller 27 assembly, and a portion of the discharge chute 34. A pivot shaft 19 is centrally located between the idler 23 and movable 26 sprockets and terminates in bearings mounted in the right 8 and left 9 enclosure panels. Tension rods 29 are attached on each side near the top of the pivot bracket 20 to position and restrain the adjustable components during shelling. These tension rods 29 are held by a connector plate 30 affixed to an adjusting screw 32. The adjusting screw passes 32 through a threaded insert 31 near the top of the rear panel 6 and turned by way of a knob 33 by the user. The gauging plate 15 is attached at the top of the pivot bracket 20 and moves accordingly with the bracket 20 as it is adjusted. Coincident with the movement of the pivot bracket 20, a projection on the gauging plate 15 extends through the top panel 4 thereby providing a visual reference on the relative position of the movable mechanism inside the enclosure. It is the purpose of the idler sprocket 23 to move oppositely to the movable sprocket 26 in a manner that maintains even tension on the chain 18.

Figure 3:
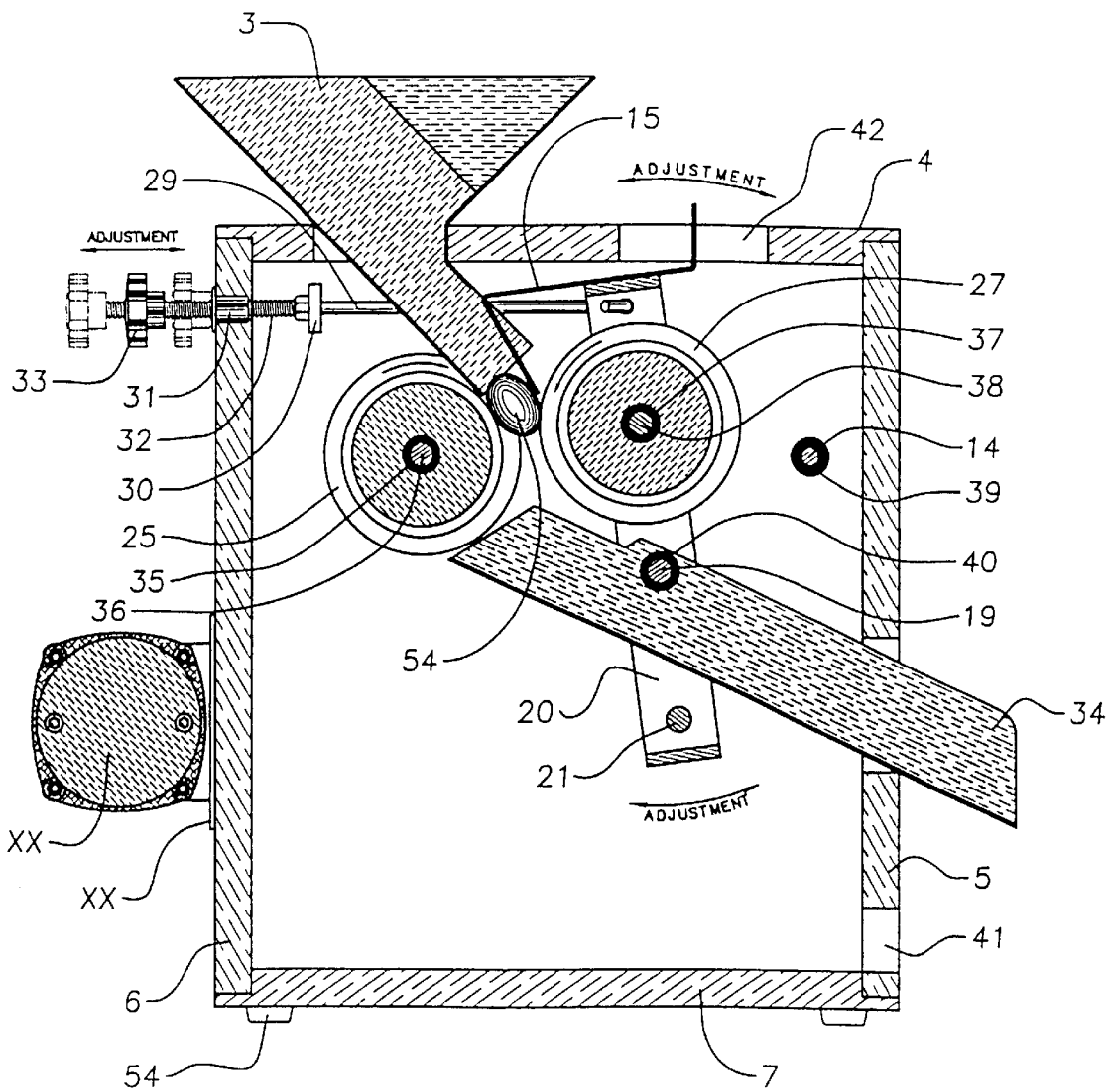
FIG. 3 is an upright sectional view taken from FIG. 1.

FIG. 3 is an upright sectional view of the apparatus for shelling nuts as taken from FIG. 1. Though much of the detail is replicated in FIG. 2 and elsewhere, this view illustrates a nut 54 exiting the supply hopper 3 and being guided by the gauging plate 15 into the opening between the cracking rollers 25 and 27. FIG. 3 further illustrates the relative motions provided by the adjusting mechanism 29, 30, 31, 32 and 33. The nominal range of adjustment provided by a working prototype of this design would accept nuts varying in diameter from ½" to 1¼"; however, it is not intended to limit the size and scale of this invention to those dimensions. It is noted that the axle for the fixed roller 25 and its driving sprocket terminates in bearings mounted in the right and left enclosure panels. Pivot shaft 19 passes through the upright sides of the discharge chute 34, which, in concert with an appropriately sized opening in the front panel 5, secures the relative position of the chute. The supply hopper 3 nests inside a close fitting opening in the top panel 4 and may be easily removed by the user. An access opening 41 is provided near the bottom of the front panel 5 to allow removal of small fragments that may collect inside the enclosure. Cushion pads 54 are attached beneath the base 7 for surface protection and to reduce shifting and movement as the device is operated.

Figure 4:
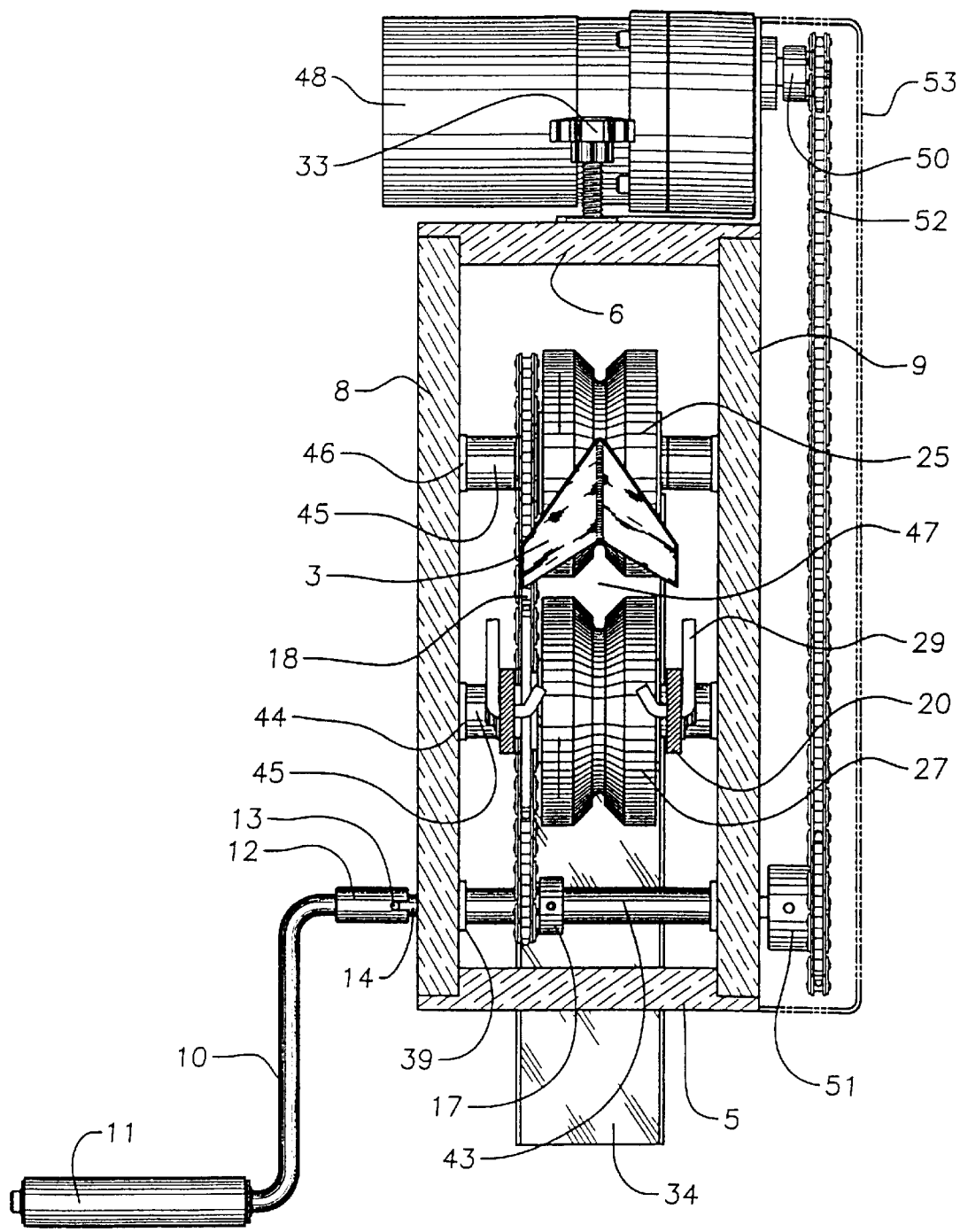
FIG. 4 is a top sectional view taken from FIG. 2.

FIG. 4 is a top sectional view taken from FIG. 2, but with the right side panel 8 restored in place. This view builds upon the preceding FIGS. and descriptions by showing the relative positioning of elements inside the enclosure. Bearings 39, 44 and 46 are mounted in the right 8 and left 9 enclosure panels. These provide the fixed locations for the driven shaft 14, idle shaft 19 and fixed roller shaft 36. Also shown are tubular spacers 43 and 45 which, when fitted on either side of the mechanisms, provide positional location of the various elements. Spacer lengths vary as required for proper running clearance on rotating members of the mechanism. It is in this view that the groove configuration of the cracking rollers 25 and 27 is shown. The adjustable opening 47 between these rollers depict multiple contact surfaces with which to grip, feed, and crack nuts of various sizes.

Figure 5:
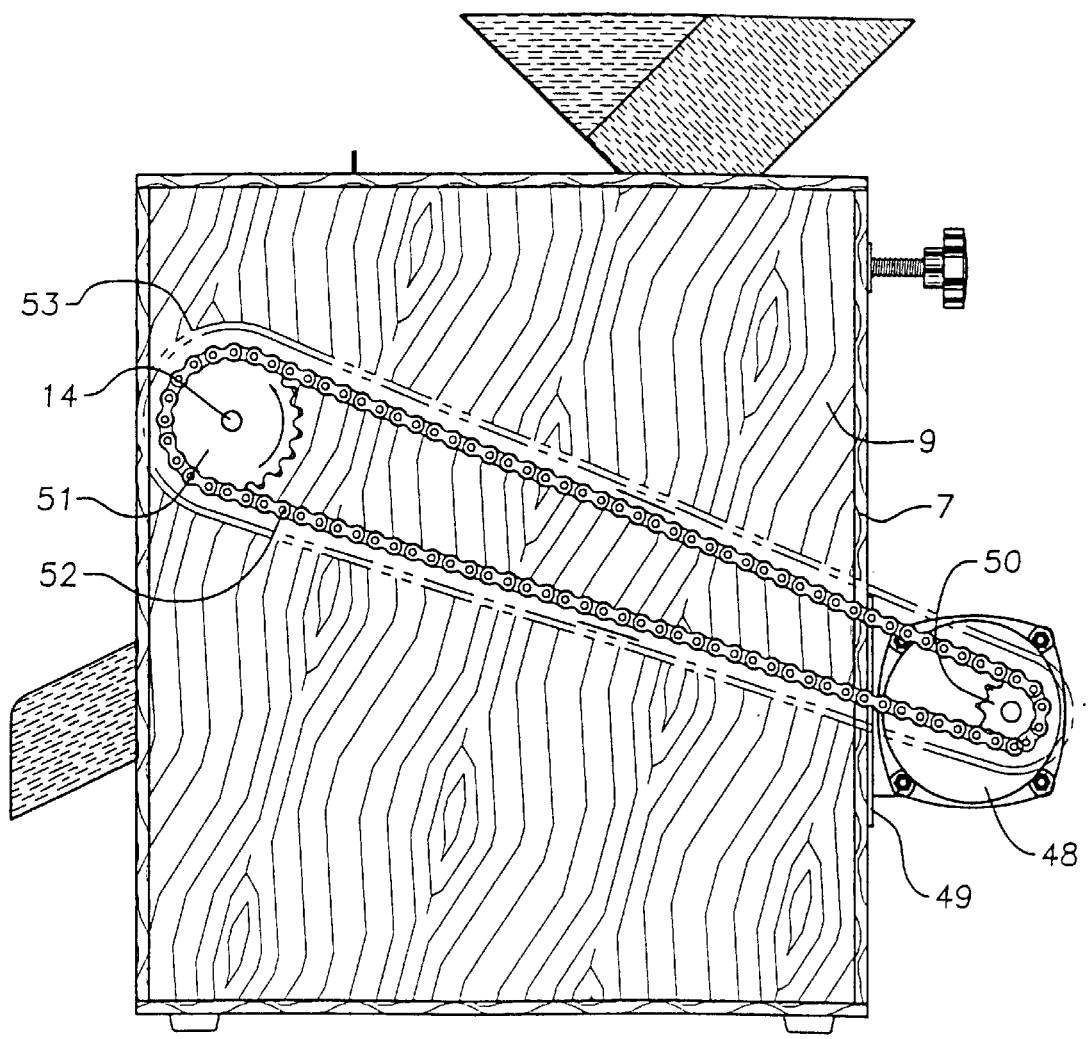
FIG. 5 depicts the invention upright and from the left side to illustrate optional motor-driven components.

FIG. 5 depicts the invention upright and from the left side to illustrate the optional motor-driven components. A gear-reduced electric motor 48 is shown with mounting bracket 49 attached to the rear panel 7. A chain 52 transmits the driving force from the motor sprocket 50 to the driven sprocket 51. This in turn rotates the input drive shaft 14 thus turning the internal mechanism in a similar fashion as provided by the manual crank method previously described. A removable guard 53 is provided for operator protection.

The preferred embodiment of the disclosure contained herein is merely illustrative and variations can be made in form without compromising the scope or sacrificing the advantages of the invention. Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A nut shelling apparatus comprising:
   a) a hopper to store and guide a plurality of nuts through a hopper opening; and,
   b) opposed rollers each having a V-shaped concentric beveled groove formed therein, thereby forming at least two sets of oppositely-disposed substantially-parallel gripping/cracking surfaces and a feed-through opening between at least two sets of gripping/cracking surfaces;
   c) the opposed rollers being disposed adjacent to the hopper with the feed-through opening being disposed to receive nuts through the hopper opening; and
   d) the opposed rollers operating in a counter-rotating fashion such that at least two sets of gripping/cracking surfaces grip and increasingly apply cracking forces across each of the plurality of nuts as each of the plurality of nuts is forced through the feed-through opening between the opposed rollers to crack, shell and discharge the plurality of nuts.

2. The nut shelling apparatus of claim 1 further comprising a gauging plate to vary clearance in a throat of the hopper to inhibit oversize nuts from entering the opening.

3. The nut shelling apparatus of claim 2 wherein the gauging plate further comprises a projecting portion to provide a visual indication of relative spacing between the opposed rollers.

4. The nut shelling apparatus of claim 1 wherein the opposed rollers are operated with a manual crank.

5. The nut shelling apparatus as recited in claim 4 wherein the manual crank is removable.

6. The nut shelling apparatus of claim 1 wherein the opposed rollers are motor-driven.

7. The nut shelling apparatus of claim 1 wherein the opposed rollers are adapted to crack pecans.

8. A method of shelling nuts comprising steps of:
   a) placing a plurality of nuts into a supply hopper;
   b) activating counter-rotating rollers each having a V-shaped concentric beveled groove formed therein, which thereby form at least two sets of oppositely-disposed substantially-parallel gripping/cracking surfaces and a feed-through opening between at least two sets of gripping/cracking surfaces;
   c) guiding and gripping the plurality of nuts through the feed-through opening between the counter-rotating rollers such that at least two sets of gripping/cracking surfaces increasingly apply cracking forces across each of the plurality of nuts as each of the plurality of nuts is forced through the feed-through opening between the counter-rotating rollers;
   d) discharging the plurality of shelled nuts onto an inclined chute; and,
   e) collecting meat and shell fragments in a container.

9. The method as recited in claimed 8 wherein step b) is performed with a hand crank.

10. The method as recited in claimed 8 wherein step b) is performed with a motor.

11. The method as recited in claimed 8 further comprising the step of adjusting clearance between the counter-rotating rollers.

12. The method as recited in claimed 8 further comprising the step of varying clearance in the throat of the hopper to inhibit oversize nuts from entering the counter-rotating rollers.

* * * * *